United States Patent [19]
Wallace

[11] Patent Number: 4,895,599
[45] Date of Patent: Jan. 23, 1990

[54] COATING FOR VDT SCREENS

[76] Inventor: Paul Wallace, 1198 Davenport Road, Toronto, Ontario, Canada, M6C 2G8

[21] Appl. No.: 229,952

[22] Filed: Aug. 9, 1988

[51] Int. Cl.⁴ .............................................. C08L 1/08
[52] U.S. Cl. ............................... 106/189; 106/287.14; 106/287.16
[58] Field of Search ...................... 252/174.15, 174.25, 252/164, 165; 106/189

[56] References Cited

U.S. PATENT DOCUMENTS

| | | | |
|---|---|---|---|
| 3,718,614 | 2/1973 | Smyth | 106/189 |
| 3,955,997 | 5/1976 | Sagane et al. | 106/189 |
| 4,657,594 | 4/1987 | Struss | 106/409 |

Primary Examiner—Theodore Morris
Attorney, Agent, or Firm—Armstrong, Nikaido, Marmelstein, Kubovcik & Murray

[57] ABSTRACT

A liquid composition for application as a coating to screens of video display terminals (VDT's). The composition comprises a mixture of pure silica as a flattening agent, a surface active copolymer to minimize the build-up of static electricity on the surface of the screen, hydroxyethyl cellulose polymer as a thickener and glycerol as a carrier. The ingredients are present in relative concentrations so as to be effective for their intended purpose in the final mixture. The composition according to the present invention when applied as a coating to a VDT screen results in dispersion or defraction of light in a very effective manner, while at that same time reducing static electricity on the screen and cleaning the screen.

10 Claims, No Drawings

COATING FOR VDT SCREENS

BACKGROUND OF THE INVENTION

The present invention relates to a liquid composition for application as a coating to screens of video display terminals (VDT's), and more particularly to such a composition which may be used not only to clean the VDT screens, but also to make it easier and more comfortable for a person to work in front of such a screen.

Persons who work constantly or for long periods of time in front of VDT screens often experience problems ranging from the very simple one of the screen becoming dirty and therefore less easy to read, to more difficult ones including chronic fatigue and eye strain or an inability to clearly see the screen as a result of glare from surrounding lighting.

The problem of a dirty screen has in the past been addressed by using a conventional window cleaner containing for example ammonia or an ammonia compound, to clean the screen. The problem of glare has been overcome by turning up the contrast of the characters being displayed on the VDT screen although, as the luminence of the characters is increased, there is a tendency for them to blur and hence become less legible.

The problem of chronic fatigue has been linked to a build up of static electricity on the surface of the VDT screen. Static electricity or positive ions are repelled from the screen to cause a depletion of negative ions which then attracted from the VDT operator's skin. This negative ion depletion in the operator has been linked to muscular function and fatique as well as to nerve impulses (see e.g. "Effects of Cathode Ray Displays on Human Health", a paper presented by Dr. C. Wallach of the Faculty of Medicine at the University of California, to the Fourth Annual Bioelectromagnetics Society Conference, Los Angeles, California, U.S.A., June, 1982).

It is an object of the present invention to provide a single product which will reduce or overcome these problems with VDT screens. It is a further object of the present invention to have such a product in the form of a liquid composition which may be coated on a VDT screen.

SUMMARY OF THE INVENTION

In accordance with the present invention a liquid composition is provided for application as a coating to the screens of VT's. The composition comprises a mixture of pure silica as a flattening agent, a surface active copolymer to minimize the build-up of static electricity on the surface of the screen, hydroxyethyl cellulose polymer as a thickener and glycerol as a carrier. The ingredients are present in relative concentrations so as to be effective for their intended purpose in the final mixture.

Water may be added, as an additional ingredient, to decrease the cost per volume of this composition.

In a preferred embodiment, the ingredients are present in the following ranges (percent by weight):
(a) pure silica - 0.1% to 5.0%
(b) surface active copolymer - 0.1% to 10.0%
(c) glycerol - 10.0% to 99.0%
(d) hydroxyethyl cellulose polymer - 0.1% to 10.0%.
(e) water - 0.1% to 75.0%

The product in accordance with the present invention may be easily applied to a VDT screen by means of a cloth or other applicator means. Not only is the screen cleaned upon such application, but also the composition remains as a coating on the screen, which composition disperses or diffracts light and, at the same time, reduces the build-up of static electricity on the surface of the screen so as to block or reduce the exchange of negative ions from the operator to the VDT screen.

DETAILED DESCRIPTION OF THE INVENTION

More particularly, the ingredients making up the liquid composition are as follows.

(a) Silica

Silica, used as a flatting agent, is a pure silica, preferably produced by a thermal process which produces a lightweight, dry, powder-like texture. The preferred silica of the present invention is a type which has an agglomerate particle size average of 4 micrometers and a particle size range of from about 2 to about 10 micrometers. Light is diffracted by these particles without affecting the visibility of the VDT screen.

(b) Surface Active Copolymers

It is preferred that these copolymers be dimethyl silicone polymers of the type containing pendant polyether groups. These polyether groups may be attached to the silicone backbone of the molecule through either hydrolyzable (SiOC) or nonhydrolyzable (Si-C) linkages. In either case they are non-reactive silicone fluids with exceptional surface active properties. A preferred copolymer is Silwet Polymer L-7602 (trade mark of Union Carbide Corporation). This is a lubricant antistat. This component is present in sufficient concentration to prevent any significant build-up of static electricity on the surface of the VDT screen.

(c) Hydroxyethyl Cellulose Thickening Agent

This is a non-ionic, water soluble polymer that can thicken, suspend, bind, emulsify, form films, stabilize, disperse, retain water and provide protective colloid action. A preferred thickener is Cellosize (trade mark of Union Carbide Corporation). There are other cellulose polymers that can be used as substitutes for this ingredient. This product is used in the process to thicken water prior to mixing it with glycerol so as to provide a cost effective product.

(d) Glycerol

Glycerol is the vehicle that allows the composition to be easily applied as a coating, and to evaporate slowly. Glycerol is unaffected by extreme temperatures (hot or cold), is transparent and is compatible with the other components of the present invention, to hold them in suspension and retain their unique properties while not adversely affecting visibility and operation of the VDT screen. As alternatives to glycerol, ethylene glycol or propylene glycol may be used.

(e) Water

Water is added to the solution only to decrease the cost per volume. As previously mentioned, Cellosize (trade mark) or another appropriate thickening agent is used to thicken the water as the viscosity of the product has a direct bearing on its effectiveness.

EXAMPLE

A batch of composition according to the present invention was made in the following manner. Warm water was combined with 2.5% net weight/volume of Cellosize (trade mark). This mixture was stirred until thickened to a shampoo-like viscosity.

An equal amount of glycerol was then added to the solution. This 1:1 ratio of glycerol and viscous water was stirred into an homogenous mixture.

Next the flatting agent, silica was added. An amount of 16 tablespoons of silica was added for every 8 fluid ounces (Imperial) of base mixture. The silica was mixed into the solution with a high speed mixer until evenly dispersed therein.

Finally, an amount of 1 teaspoon of Silwet L-7602 (trade mark) for 8 fluid ounces (Imperial) of product was added. The product was thoroughly mixed and then stored in an appropriate, closed container, ready for subsequent use.

Thus it is apparent that there has been provided in accordance with the invention a liquid composition for application as a coating to screens of video display terminals that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A liquid composition for application as a coating to screens of video display terminals, the composition comprising a mixture of:
   (a) pure silica as a flattening agent;
   (b) a surface active copolymer to minimize the build-up of static electricity on the surface of the screen selected from the group consisting essentially of dimethyl silicone polymers containing pendant polyether groups;
   (c) hydroxyethyl cellulose polymer as a thickener; and
   (d) a carrier comprising one of glycerol, ethylene glycol or propylene glycol;
   these ingredients being present in relative concentrations so as to be effective for their intended purpose in the final mixture.

2. A composition according to claim 1 further comprising a sufficient amount of water so as to make the final composition cost effective.

3. A composition according to claim 1 wherein the ingredients are present in the following ranges (weight percent):
   (a) pure silica - 0.1% to 5.0%
   (b) surface active copolymer - 0.1% to 10.0%
   (c) glycerol - 10.0% to 99.0%
   (d) hydroxyethyl cellulose polymer - 0.1% to 10.0%.

4. A composition according to claim 2 wherein the ingredients are present in the following ranges (weight percent):
   (a) pure silica - 0.1% to 5.0%
   (b) surface active copolymer - 0.1% to 10.0%
   (c) glycerol - 10.0% to 99.0%
   (d) hydroxyethyl cellulose polymer - 0.1% to 10.0%
   (e) water - 0.1% to 75.0%

5. A composition according to claim 1 wherein the silica has a lightweight, dry, powdered-like texture and an agglomerate particle size average of about 4 micrometers and a particle size range of between about 2 to about 10 micrometers.

6. A composition according to claim 1 wherein the glycerol is used a the carrier and is a purified commercial product containing at least 95% glycerol.

7. A composition according to claim 1 wherein the silica has a lightweight, dry, powdered-like texture and an agglomerate particle size average of about 4 micrometers; and the carrier is glycerol in the form of a purified commercial product containing at least 95% glycerol.

8. A composition according to claim 7 wherein the ingredients are present in the following ranges (weight percent):
   (a) pure silica - 0.1% to 5.0%
   (b) surface active copolymer - 0.1% to 10.0%
   (c) glycerol - 10.0% to 99.0%
   (d) hydroxyethyl cellulose polymer - 0.1% to 10.0%.

9. A composition according to claim 7, further comprising water.

10. A composition according to claim 9 wherein the ingredients are present in the following weight ranges:
   (a) pure silica - 0.1% to 5.0%
   (b) surface active copolymer - 0.1% to 10.0%
   (c) glycerol - 10.0% to 99.0%
   (d) hydroxyethyl cellulose polymer - 0.1% to 10.0%.
   (e) water - 0.1% to 75.0%

* * * * *